Patented Nov. 10, 1936

2,060,108

UNITED STATES PATENT OFFICE 2,060,108

TREATMENT OF BLACKSTRAP SLUDGE

John Louis Oberseider and Paul L. Robison, Philadelphia, Pa., assignors to The Atlantic Refining Company, Philadelphia, Pa., a corporation of Pennsylvania No Drawing. Application December 15, 1933, Serial No. 702,546

5 Claims. (Cl. 23—51)

The present invention relates to the recovery of valuable materials from the waste products of petroleum refining, and relates more particularly to the breaking of blackstrap emulsions resulting from the treatment of mineral oil distillates with alkaline plumbite solutions.

Most light mineral oil distillates, such as gasoline, kerosene and furnace oils, contain sulfur compounds which render them corrosive and of disagreeable odor, and therefore unsuitable for the market. These compounds may be partially removed, or at least converted to a less objectionable form, by agitating the distillate with an alkaline solution of sodium plumbite, with or without the addition of free sulfur to complete the reaction.

By such treatment there is formed a black, insoluble precipitate, commonly known as "blackstrap", which settles away from the treated oil with the aqueous solution of spent plumbite. This precipitate consists of lead sulfide together with lead salts of the mercaptans, and other organic compounds of lead. In normal operation, settling of the oil-plumbite-blackstrap mixture results in the production of a two layer system, the upper layer being the sweetened oil and the lower layer consisting of a weak plumbite solution containing the blackstrap emulsion. This emulsion generally consists of oil, an aqueous solution of caustic soda, sodium plumbite, sodium thiosulfate, sodium sulfate, and lead sulfide, and may be further treated to effect a separation of the oil contained therein from the lead sulfide and spent plumbite solution.

Heretofore, the breaking of the blackstrap emulsion has usually been effected by heating, for example, with steam. This method, however, does not give as complete a separation of components as is desirable.

It has been a customary procedure, in the treating of raw distillates, to wash them with a caustic soda solution, prior to the sweetening treatment with alkaline plumbite, in order to remove as much sulfur as is possible, in the form of hydrogen sulfide, free sulfur and some mercaptans. The spent caustic solution from this preliminary treatment contains primarily caustic soda, sodium sulfide, sodium acid sulfide, sodium mercaptide, sodium sulfate and thiosulfate.

We propose to effect a more rapid and complete breaking of the aforesaid blackstrap emulsion by adding thereto a quantity of the spent caustic solution and heating the mixture, as by steam, to a temperature, for example of from about 80° F. to about 230° F. During the addition of the spent caustic solution to the emulsion, and/or during the step of bringing the mixture to proper temperature, said mixture may be agitated by mechanical means, by air or steam, or by the convection currents set up as a result of the heating. Our process is operable at temperatures higher than 230° F. and/or under superatmospheric pressure. The mixture may be maintained at a suitable breaking temperature until a separation of the emulsion into a three layer system is effected. The upper layer will consist of oil, the middle layer of an aqueous solution of soluble salts and the lower layer of lead sulfide wetted with the aqueous solution of salts. The layers may be separately withdrawn and disposed of as desired.

The reactions taking place during the breaking of the emulsion may be represented by the following equations, in which the unused plumbite in the spent plumbite solution reacts with the sodium acid sulfide, sodium sulfide and sodium mercaptide contained in the spent caustic solution.

(1)   $Na_2PbO_2 + NaHS + H_2O \rightarrow 3NaOH + PbS$ (2)   $Na_2PbO_2 + Na_2S + 2H_2O \rightarrow 4NaOH + PbS$ (3a)  $Na_2PbO_2 + 2NaRS + 2H_2O \rightarrow$
$$4NaOH + Pb(RS)_2$$

(3b)        $Pb(RS)_2 + S \rightarrow R_2S_2 + PbS$

In Equation (3b) the lead mercaptide resulting from (3a) may be converted to the disulfide $R_2S_2$ by the addition of free sulfur to the spent caustic solution.

It will be seen that the undesirable constituents of the spent caustic solution, i. e., the sodium acid sulfide, sulfide and mercaptide, are converted into caustic soda and simultaneously the unused plumbite of the spent plumbite solution contained in the blackstrap emulsion is converted into caustic soda and lead sulfide, which end products may readily be recovered as such or converted into fresh plumbite solution by oxidation. The lead sulfide or "blackstrap" may be converted into soluble plumbite reagent by several methods known to those skilled in the art, as for example, by air blowing the blackstrap in the presence of added caustic soda, or by weathering the blackstrap to oxidize the same to lead sulfate and then dissolving the sulfate in caustic soda solution. Due to the removal of lead from the spent plumbite solution, the specific gravity of said solution is lowered, thereby increasing the specific gravity differential between the precipitated lead sulfide and the aqueous solution, thus permitting of a more rapid settling of lead sulfide. Furthermore, the increase in concentration of caustic soda in the solution containing the emulsion, due to the reaction of the unused spent plumbite with the sodium sulfide, acid sulfide and mercaptide, tends to aid in breaking the emulsion and releasing the oil.

Our invention may be illustrated by the following example:

325 bbl. of blackstrap emulsion was mixed with 49 bbl. of spent caustic solution in an agitator. The mixture was heated by means of steam to a temperature of about 155° F., the emulsion breaking and being allowed to separate into layers. Upon withdrawing the respective layers from the agitator, there was obtained a yield of 59 bbl. of oil, 193 bbl. of caustic solution and 131 bbl. of lead sulfide slurry. Analysis of the caustic solution thus recovered showed that no lead was present.

As a result of operating in accordance with our invention, the advantages which accrue therefrom are (1) shorter time is required to break the emulsion and effect settling, (2) less steam is required, (3) a larger recovery of oil is obtained, (4) an aqueous caustic solution is obtained which is free of dissolved and suspended lead, thereby reducing loss of lead upon discarding a portion of the solution, which is necessary in practical operation, (5) the return of all lead to the plumbite reforming process is insured, (6) the recovery of caustic from the spent caustic solution may readily be effected and, (7) the transformation of mercaptide and sulfur content from the spent caustic solution to an unobjectionable form is accomplished in utilizing these undesirable compounds to precipitate the lead as sulfide.

While hereinabove we have described our invention particularly with reference to the employment of spent caustic solutions from naphtha refining in the breaking of blackstrap emulsions, we do not intend to limit ourselves thereto, but contemplate including within the scope of our invention, employment of spent alkaline solutions such, for example, as those which result from the scrubbing of sulfur compounds from refinery, cracked gas or coal gas. We also consider as within the spirit and scope of our invention, the employment of any reagent which will precipitate the unused plumbite of the blackstrap emulsion in the form of a lead salt, which is convertible into an alkaline plumbite solution, as for example, solutions of the sulfides, acid sulfides, poly-sulfides and/or mercaptides of the alkali metals.

What we claim is:

1. The method of treating an emulsion containing lead sulphide resulting from treating an oil with plumbite solution for the recovery therefrom of valuable products, which comprises adding to the emulsion a caustic alkali solution containing at least one compound from the group consisting of the alkali metal sulfides, acid sulfides, polysulfides and mercaptides, agitating the mixture, allowing the mixture to stratify into layers and separating said layers.

2. The method of treating an emulsion containing lead sulfide resulting from treating an oil with plumbite solution for the recovery therefrom of valuable products, which comprises admixing said emulsion with a caustic alkali solution containing at least one compound from the group consisting of the alkali metal sulfides, acid sulfides, polysulfides and mercaptides, heating the mixture, allowing the heated mixture to stratify into layers, and separating said layers.

3. The method of treating an emulsion containing lead sulfide resulting from treating an oil with plumbite solution for the recovery therefrom of valuable products, which comprises admixing said emulsion with a caustic alkali solution containing at least one compound from the group consisting of the alkali metal sulfides, acid sulfides, polysulfides and mercaptides, heating the mixture to a temperature not exceeding substantially 230° F., allowing the heated mixture to stratify into layers, and separating said layers.

4. The process for breaking an emulsion containing lead sulfide resulting from treating an oil with plumbite solution which comprises admixing said emulsion with a spent caustic alkali solution containing alkali sulfides and mercaptides resulting from the treatment of sulfur-containing hydrocarbon oils with a caustic solution, allowing said mixture to stratify into layers, and separating said stratified layers.

5. The process for breaking an emulsion containing lead sulfide resulting from treating an oil with plumbite solution which comprises admixing said emulsion with a spent caustic alkali solution containing alkali sulfides and mercaptides resulting from the treatment of sulfur-containing hydrocarbon oils with a caustic solution, heating the mixture, allowing the heated mixture to stratify into layers, and separating the resulting oil, aqueous caustic and lead sulfide layers.

JOHN LOUIS OBERSEIDER.
PAUL L. ROBISON.